United States Patent
Michel et al.

(10) Patent No.: US 11,691,404 B2
(45) Date of Patent: Jul. 4, 2023

(54) METHOD FOR FORMING A STRESS-FREE MULTILAYER PVC SHEET MATERIAL

(71) Applicants: KREAFIN GROUP SA, Luxembourg (LU); LICOPLAST SA, Battice (BE)

(72) Inventors: Yves Michel, Meldert (BE); Willy D'Hondt, Deinze (BE)

(73) Assignees: KREAFIN GROUP SA, Luxembourg (LU); LICOPLAST SA, Battice (BE)

( * ) Notice: Subject to any disclaimer, the term of this patent is extended or adjusted under 35 U.S.C. 154(b) by 297 days.

(21) Appl. No.: 16/608,122

(22) PCT Filed: Apr. 24, 2018

(86) PCT No.: PCT/IB2018/052855
§ 371 (c)(1),
(2) Date: Oct. 24, 2019

(87) PCT Pub. No.: WO2018/198034
PCT Pub. Date: Nov. 1, 2018

(65) Prior Publication Data
US 2021/0101324 A1    Apr. 8, 2021

(30) Foreign Application Priority Data
Apr. 24, 2017  (BE) .................................. 2017/5285

(51) Int. Cl.
*B29C 48/00* (2019.01)
*B29C 48/21* (2019.01)
(Continued)

(52) U.S. Cl.
CPC .......... *B32B 37/02* (2013.01); *B29C 48/0011* (2019.02); *B29C 48/0021* (2019.02);
(Continued)

(58) Field of Classification Search
CPC ......... B29C 48/00; B29C 48/21; B29C 48/08; B29C 48/90; B32B 27/30; B32B 27/08; B32B 37/15
(Continued)

(56) References Cited

U.S. PATENT DOCUMENTS 5,030,504 A    7/1991 Botsolas et al.

FOREIGN PATENT DOCUMENTS

| CN | 102345369 A | 2/2012 |
| CN | 105133818 A | 12/2015 |

(Continued)

OTHER PUBLICATIONS

Machine_english_translation_JP_2002234116_A; Nobori, Y. et.al.; Sheet Having Marble Pattern and Method for Manufacturing the Same; Aug. 20, 2002; EPO; whole edition (Year: 2002).*
(Continued)

*Primary Examiner* — Tahseen Khan
(74) *Attorney, Agent, or Firm* — Fresh IP PLC; Clifford D. Hyra; Aubrey Y. Chen

(57) ABSTRACT

A method for forming a multilayer plastic sheet material (1) for floor and/or wall panels, wherein a first polymer mass comprising a rigid PVC is melted under pressure and is passed through an extruder head at a specified discharge rate in the form of a plastic strand in sheet form that is provided with one or more layers so that a multilayer plastic strand is formed, which is passed to two or more rolls of a finishing stand, which processes the multilayer plastic strand into a sheet of defined thickness, which is then led away via a transport device to a sawing device to be cut to the desired length, wherein, after the plastic strand in sheet form leaves the extruder head, it is first passed between a top roll and a bottom roll of a roughing stand, wherein the speed of the rolls of the finishing stand and the rolls of the roughing stand
(Continued)

is synchronized with the discharge rate of the plastic strand in sheet form from the extruder head, so that said plastic strand is processed without stress.

8 Claims, 3 Drawing Sheets

(51) Int. Cl.
*B29C 48/08* (2019.01)
*B29C 48/90* (2019.01)
*B32B 27/30* (2006.01)
*B32B 27/08* (2006.01)
*B32B 37/15* (2006.01)
*B32B 37/02* (2006.01)
*B29C 48/07* (2019.01)
*B29C 48/154* (2019.01)
*B29C 48/92* (2019.01)
*B29C 48/49* (2019.01)
*B29C 48/305* (2019.01)
*B29K 27/06* (2006.01)

(52) U.S. Cl.
CPC ........ *B29C 48/0022* (2019.02); *B29C 48/022* (2019.02); *B29C 48/07* (2019.02); *B29C 48/08* (2019.02); *B29C 48/154* (2019.02); *B29C 48/21* (2019.02); *B29C 48/906* (2019.02); *B29C 48/92* (2019.02); *B32B 27/08* (2013.01); *B32B 27/304* (2013.01); *B32B 37/153* (2013.01); *B29C 48/002* (2019.02); *B29C 48/305* (2019.02); *B29C 48/307* (2019.02); *B29C 48/49* (2019.02); *B29C 2948/926* (2019.02); *B29C 2948/9258* (2019.02); *B29C 2948/92904* (2019.02); *B29C 2948/92923* (2019.02); *B29K 2027/06* (2013.01); *B29K 2995/007* (2013.01); *B29K 2995/0077* (2013.01); *B32B 2266/0235* (2013.01); *B32B 2307/54* (2013.01); *B32B 2307/546* (2013.01); *B32B 2307/75* (2013.01); *B32B 2471/00* (2013.01); *B32B 2607/00* (2013.01)

(58) Field of Classification Search
USPC ...................................................... 428/195.1
See application file for complete search history.

(56) References Cited

FOREIGN PATENT DOCUMENTS

| | | |
|---|---|---|
| CN | 105459422 A | 4/2016 |
| JP | H07 100898 A | 4/1995 |
| JP | 2002234116 A * | 8/2002 |
| TW | 10 2012 112446 A1 | 7/2014 |
| WO | WO 2013/083290 A1 | 6/2013 |
| WO | WO 2017/027155 | 2/2017 |

OTHER PUBLICATIONS

Andreas Weseler, In-Line Production Process for luxurious floor tiles, Apr. 2, 2014; Krauss Maffei; whole document (Year: 2014).*
KraussMaffei Berstorff: PVC Sheet Line With Co-Extrusion11 • Youtube • Sep. 9, 2014 (Sep. 9, 2014), XP054978593, Retrieved from the Internet: URL:https://www.youtube.com/watch?v=B6X7g-bwqel.
Keith Piggott: Product Guide The essential reference for semi-finished plastic products (2008-2009)11 , Perspex Jan. 1, 2008 (Jan. 1, 2008), pp. 112-145,190-207, XP002783748.
Andreas Weseler: In-line production process for luxurious floor tiles11, Apr. 2, 2014 (Apr. 2, 2014), pp. 1-3, XP055420457, Company Homepage.
International Search Report dated Aug. 31, 2018.

* cited by examiner

US 11,691,404 B2

METHOD FOR FORMING A STRESS-FREE MULTILAYER PVC SHEET MATERIAL

This application is a National Phase entry of International Application No. PCT/IB2018/052855 under § 371 and claims the benefit of Belgian patent application No. BE-2017/5285, filed Apr. 24, 2017, which is hereby incorporated by reference in its entirety.

FIELD OF THE DISCLOSURE

The present invention relates, on the one hand, to a method for forming a multilayer plastic sheet material for floor and/or wall panels, wherein a first polymer mass comprising a rigid PVC is melted under pressure and is forced through an extruder head at a specified discharge rate in the form of a plastic strand in sheet form that is provided with one or more layers so that a multilayer plastic strand is formed, which is propelled towards two or more rolls of a finishing stand, which processes the multilayer plastic strand into a sheet of defined thickness, which is then led away via a transport device to a sawing device to be cut to the desired length, wherein, after the plastic strand in sheet form leaves the extruder head, it is first passed between a top roll and a bottom roll of a roughing stand, wherein the speed of the rolls of the finishing stand and the rolls of the roughing stand is synchronized with the discharge rate of the plastic strand in sheet form from the extruder head, so that said plastic strand is processed without stress. On the other hand, the present invention relates to a multilayer sheet material with an elastic modulus (E) above 1000 N/mm$^2$, preferably between 2000 N/mm$^2$ and 3000 N/mm$^2$, and a specified length and width.

The present invention relates in particular to a method that allows a multilayer PVC sheet material to be formed with minimum possible internal stresses.

BACKGROUND

The sheet material that is manufactured by said method is in particular a plastic panel manufactured from PVC, which can be both a floor panel and a wall panel. The thickness of such panels is preferably between 2 and 10 mm, in particular between 3 and 8 mm. The panels that are manufactured as standard preferably have a width between 5 and 300 cm and a length between 10 and 500 cm.

The known panels are manufactured by an extrusion process. A disadvantage of this technique is that stresses are built up in the finished material. There is consequently a risk of subsequent development of fine cracks in the material.

The Japanese patent publications JP 2002 234116A and JP H07 100898A describe a known extrusion process.

SUMMARY

An aim of embodiments of the present invention is to supply a method that will allow stress-free manufacture of sheet material.

This aim may be achieved by a method for forming a multilayer plastic sheet material for floor and/or wall panels, wherein a first polymer mass comprising a rigid PVC is melted under pressure and is passed through an extruder head at a specified discharge rate in the form of a plastic strand in sheet form that is provided with one or more layers so that a multilayer plastic strand is formed, which is passed to two or more rolls of a finishing stand, which processes the multilayer plastic strand into a sheet of defined thickness, which is then led away via a transport device to a sawing device to be cut to the desired length, wherein, after the plastic strand in sheet form leaves the extruder head, it is first passed between a top roll and a bottom roll of a roughing stand, wherein the speed of the rolls of the finishing stand and the rolls of the roughing stand is synchronized with the discharge rate of the plastic strand in sheet form from the extruder head, so that said plastic strand is processed without stress, and wherein a second polymer mass comprising a flexible PVC is melted under pressure and is co-extruded on the first polymer mass, and then both are passed through the extruder head in the form of a multilayer plastic strand in sheet form, the top layer of which is formed by the second polymer mass.

In a particular embodiment of the method according to the invention, the second polymer mass comprising a flexible PVC is melted under pressure and is co-extruded on the underside of the first polymer mass, and both are then passed through the extruder head in the form of a multilayer plastic strand in sheet form, this additional second polymer mass forming a stabilizing layer for the multilayer sheet material. The stabilizing layer preferably has the same thickness as the top layer. The stabilizing layer will prevent warping of the sheet material.

Preferred embodiments of the method are described in the dependent claims.

The present invention in some embodiments further relates to a multilayer sheet material with an elastic modulus (E) above 1000 N/mm$^2$, preferably between 2000 N/mm$^2$ and 3000 N/mm$^2$ and a specified length and width, wherein said sheet material comprises a carrier material formed from rigid PVC provided with one or more layers, wherein the sheet material, after heating to 80° and cooling back to room temperature, has expansion or shrinkage of max. 0.2% on the initial length and/or width and wherein the carrier material formed from rigid PVC is provided with a top layer of flexible PVC. Preferably, after heating to 80° and cooling back to room temperature, the sheet material has expansion or shrinkage of max. 0.1% on the initial length and/or width.

Preferred embodiments of the sheet material according to the invention are described in the dependent claims.

To explain the properties of this invention and to indicate additional advantages and particular features thereof, a more detailed description of the method and the sheet material according to the invention is presented below. It should be pointed out that nothing in the following description is to be interpreted as a limitation of the protection claimed in the claims.

BRIEF DESCRIPTION OF THE DRAWINGS

This description is explained with the aid of the appended drawings, in which.

DETAILED DESCRIPTION

A sheet material (1) according to some embodiments of the present invention is a PVC sheet built up from several layers, which will preferably be used as a waterproof and low-noise floor or wall covering.

Figure 1:
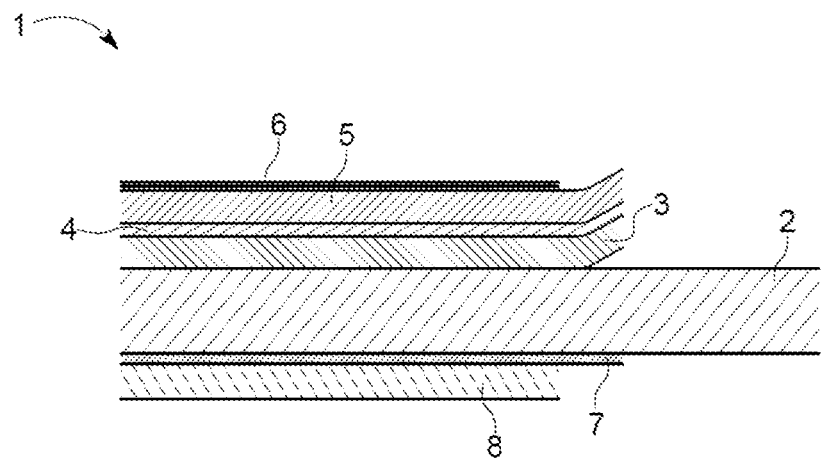
FIG. 1: a schematic representation of a multilayer sheet material according to the invention.

As can be seen from FIG. 1, the sheet (1) is built up as follows:
1) UV varnish coat (6), about 25 g/m²;
2) wearing layer (5);
3) decorative layer (4) (film) made of PVC (may optionally also be PP or PE);
4) flexible PVC layer (3);
5) rigid PVC layer (2), which functions as a carrier or base sheet;
6) layer of adhesive (7), preferably an EVA adhesive (other types of adhesive may also be considered);
7) bottom layer (8), preferably made of a foamed material.

Obviously sheet materials with some other structure likewise fall within the scope of protection of this invention, such as for example a sheet material where a decorative layer (4) is not present and the decorative effect is provided by providing the wearing layer (5) (preferably on the underside) with printing or where the wearing layer is omitted for the wall application and the decorative effect is applied via the decorative layer (4) or by direct printing on the flexible PVC layer (3) or on the rigid PVC layer (2) before applying the UV varnish coat (6).

The rigid PVC layer (2) of the sheet material may also be provided on its underside with a flexible PVC layer, which functions as a stabilization (stabilizing) layer. The stabilizing layer preferably has the same thickness as the flexible PVC layer that forms the top layer (3). The stabilizing layer is applied at the same time as the top layer. Through the presence of the stabilizing layer, the sheet material will be less susceptible to the so-called "bimetal effect" and the sheet will remain straight and will not warp.

The various layers from which the sheet is built up may be manufactured (applied) in a single production process, and if a structure is also applied in the surface, this may for example be a wooden or stone structure. The method in an embodiment is described below, along with the precise points requiring attention in order to keep it stress-free.

Step 1: Manufacture of the Carrier Sheet:

The basis or the core of the sheet (1) is the layer of rigid PVC (2) provided with a layer (3) of flexible PVC. Both layers are manufactured by means of a so-called multilayer T-die (9). Said die is connected to two separate extruders. The main extruder supplies the material for the rigid PVC layer (2), and a second extruder, the so-called co-extruder, supplies the material for the flexible PVC layer (3). The two layers are distributed in the die over a sheet width with a specified thickness and density.

A rigid PVC consisting of various components is processed in the main extruder. Fillers and minerals may also be added via a mixer on top of the extruder, in order to obtain optimum thermal stability of the sheet (1). Addition of a chemical blowing agent provides small air bubbles in the sheet, thus reducing the specific weight of the sheet. During the extrusion process, the additives are mixed and melted with the PVC, this melt enters the die at a specified pressure and temperature and is spread by the "hat-rack" principle over the full width of the die and with a specified thickness.

The action of the co-extruder is similar; the material fed into the co-extruder is a flexible PVC with a specified Shore hardness. The Shore hardness of the flexible PVC is preferably between 80 and 100, more particularly between 85 and 95. The purpose of the flexible PVC layer is on the one hand to guarantee perfect thermal fusion with the decorative film (see hereunder) and on the other hand to create a soft feel.

It is important that the flows of the two layers in the die advance at the same speed, to avoid stresses and warping of the sheet during subsequent thermal loading. The lip opening of the die (where the material is forced out) must be set according to a specified ratio so that the final thickness of the co-extruded sheet leaves the die within a specified thickness ratio. If these speeds are too different over the width of the die, the shrinkage ratios on cooling of the sheet will be insufficient to be able to guarantee a good, stable floor.

Figure 2:
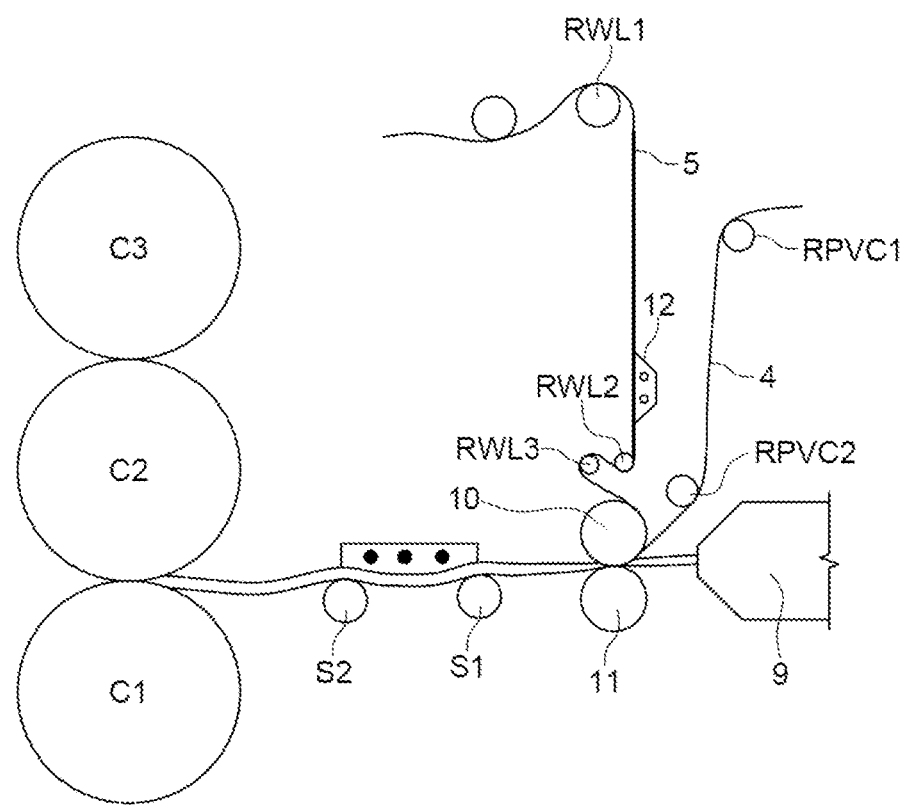
FIG. 2: shows schematically a part of the device in which the method according to the invention is applied.

Step 2, Pre-Thickness Calibration of Sheet+Pre-Lamination of Decorative (Film) Layer and Wearing Layer (see FIG. 2)

Once the melt comes out of the die (9), this melt is received by two rolls (10, 11) that form part of a roughing stand, namely a top roll (10) and a bottom roll (11). A specific feature of these rolls is that they must be maintained at a specified temperature so that the hot melt leaving the die (9) is not cooled immediately owing to an excessive temperature difference between the rolls and the hot melt. A specific composition of silicone rolls is selected for this purpose.

The operation of the roughing stand is as follows:
a) a first pre-calibration in thickness of the melt leaving the T-die (9), together with the applied decorative layer (4) and wearing layer (5). The gap between the two rolls (10, 11) must therefore be very accurate so that the rolls (10, 11) do not press excessively on the sheet, which is still hot.
b) light pressing of the decorative layer on the hot sheet. The decorative layer is preferably a layer of PVC film. This PVC film comes from a roll produced beforehand. The unwinding of the film takes place over a number of rolls, the roll RPVC 1 is a roll that measures the stress constantly on the decorative layer (PVC film) (4) and ensures that the forces exerted that are necessary for unwinding the PVC film are always the same, regardless of the diameter of the roll of PVC film or the film thickness. The roll RPVC 2 is located at a specified angle. The purpose of this roll is to bring the film under the wearing layer (5) and between the rolls (10 and 11) of the roughing stand, in such a way that there is no inclusion of air between the PVC film (4) on the one hand and the wearing layer (5) and the extruded PVC sheet. Temperature, stresses, angle and distance are very important for obtaining a stable process. Of course, the whole unwinding unit is provided with continuous web tensioning and web guidance.
c) Applying the wearing layer (5) on the 3 layers already present: the decorative film, flexible PVC layer and rigid PVC layer. The wearing layer (5) is also unwound by a complete unwinding unit provided with web tensioning and web guidance. However, a number of points have to be taken into account.
1) Depending on the thickness of the wearing layer (5), it must be warmed up to some extent for example by means of IR radiant heaters (12), to make the whole a bit more flexible but also to limit the thermal shock when they are laminated together; the melt emerging from the die (9) has a temperature of about 150°, the decorative film (4) is so thin that it reaches this temperature immediately, but the wearing layer (5) has thicknesses from 0.1 to 1.0 mm and must therefore be warmed up somewhat. This is provided by the IRWL radiant heaters (12).
2) After this preheating, the film passes over a roll stand RWL2 and RWL3, and once again angles, distances and stresses are extremely important. The aim is that the preheated wearing layer is entrained almost stress-free by the top roll (10), and an important aspect is the contact surface or the angle at which the wearing layer comes into contact with the top roll.

d) Finally, the top rolls (10 and 11) will press the melt emerging from the die (9), the PVC decorative film and the wearing layer together. The gap between the rolls (10, 11) is important. It must be in proportion to the thickness of the melt emerging from the die and the thickness of the film and the wearing layer that are to be pressed together. If there is insufficient contact, air will be trapped between the different layers. With excessive contact or excessive squeezing together, creases may form on compressed sheet that are visible to the naked eye, but mechanical forces will also develop in the hot state, which will be harmful later, possibly with negative thermal stability as the sheet cools down.

e) It is therefore very important that the decorative film and the wearing layer are unwound with a certain tension, just sufficient for everything to be fused together without inclusion of air and without stretching the film and the wearing layer. On the other hand, it is also important that the melt emerging from the die is brought stress-free between the top roll and the bottom roll. Moreover, it is extremely important that the top roll and bottom roll speeds can be set accurately and separately. The rolls C1, C2 and C3 of the finishing stand, which function as master, are decisive for the speeds of the top and bottom rolls of the roughing stand. The latter are now synchronized with the speed of rolls C1, C2 and C3 with the possibility of setting a certain delta between the two speeds to prevent the development of stresses. In its turn, the extrusion speed, with the associated discharge rate of the melt from the T-die, is also synchronized with the top and bottom rolls of the roughing stand also taking into account a possible delta on these speeds, once again to prevent the possible development of stresses.

Step 3: Final Calibration of the Thickness and Introduction of a Structured Surface (Embossing) (See FIG. 3)

Once the aforementioned layers have been (pre)laminated on one another, they still need to be fused together, better calibrated on thickness and the surface must be provided with a defined embossing structure. This must all be done at specified temperatures and of course with minimum stresses.

After the roughing stand, the sheet (1) passes over 2 driven support rolls (S1 and S2). This interval is needed for carrying out the following two operations:

1) Completion of thermal fusion of all the layers. It is of course important that the various layers used are compatible (fusible) with each other with respect to chemical composition.
2) Softening (warming) the top layer of the sheet for final impressing of an attractive surface structure (embossing) with roll C2. Thus, the top part of the wearing layer (5) is made soft again by means of a second IR radiant heater (13). The lamps of this radiant heater (13) have a specific wavelength that only softens the top part of the wearing layer. It is very important not to heat up the whole wearing layer again. That is why IR lamps with a specific wavelength are used for this. The temperature of the surface after the IR radiant heaters is measured continuously and is kept constant by means of a PID control system. It is very important at this point to have a constant surface temperature over the entire surface of the sheet, for finally producing an embossing structure that is as uniform as possible in the sheet by means of roll C2.

Thus, S1 and S2 are only support rolls, there is no top roll that would compress the sheet thickness.

Moreover, it is extremely important that after it leaves the die and during its subsequent path the sheet is not under tension. In other words this sheet must not be pulled, otherwise excessive stresses will be created in the sheet. On the other hand it is necessary to ensure that the sheet also does not sag excessively. In that case the sheet will be stretched under its own weight and it is impossible to bring about a stable process. Very good synchronization with the necessary offset possibilities between on the one hand the speed of discharge from the T-die and the speed of all the aforementioned rolls is thus of the utmost importance on the one hand for obtaining a stable thickness and on the other hand to produce minimum mechanical stresses in the sheet.

After the support rolls and heating of the wearing layer with the IR radiant heaters (13), the sheet goes into the rolls of the finishing stand (calender). All three rolls have a specific constant temperature. The middle roll C2 is a structure roll, which will apply a specified structure (embossing) on the surface of the sheet (1). The accuracy or the sharpness of this structure depends on the thickness of the assembled sheet that is passed between the rolls, but also on the temperature. Once again it is necessary to find the right conditions between the temperature, pressure and thickness setting between the rolls. The slightest deviation of these factors results in a poorer finish.

The depth of the structure in the structure rolls is normally somewhat deeper than the depth of the structure in the final sheet. The great difficulty in this method of production is that a structure is impressed in the sheet while it is still almost completely soft (has not hardened). The sheet can thus be flattened without much difficulty, which in itself would make the process a bit easier. However, experience and tests teach us that this then introduces a very large mechanical load into the sheet, if we form the sheet and cool it with these introduced stresses, then the thermal properties that we obtain after cooling are actually very poor.

Figure 4:
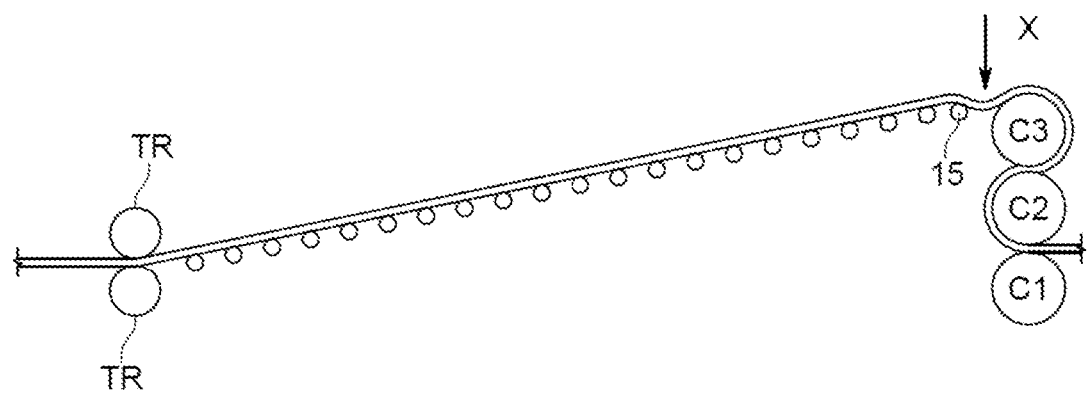
FIG. 4: shows the transport device along which the formed multilayer sheet material is led away to a sawing device.

Step 4, Stress-Free Cooling of the Sheet on a Long Roller Table at a Specified Angle (see FIG. 4)

This process has already been described in an earlier patent publication of the patent holder. Here, the sheet will be cooled on a long roller table that is set up at an angle. At the end of this roller table there are two driven pinch rolls (TR), which ensure that the sheet will advance at a specified linear speed. The sheet will sag between roll C3 and the first roll (15) of the roller table. The value or factor of the sag is measured by measuring sensors. The values of these measurements are converted and control the peripheral speed of the pinch rolls (TR) via a PID control system. In this way, the value of the sag of the sheet (factor X) will always be kept constant and we are able to state that the sheet is cooled stress-free. Once the sheet comes up to the level of the pinch rolls it has been cooled to the extent that it is in the solid state and so is no longer susceptible to certain mechanical stresses to which it may be subjected in the further course of the process (sawing off of edge strips, gluing a sound-absorbing bottom layer, sawing to length).

Figure 3:
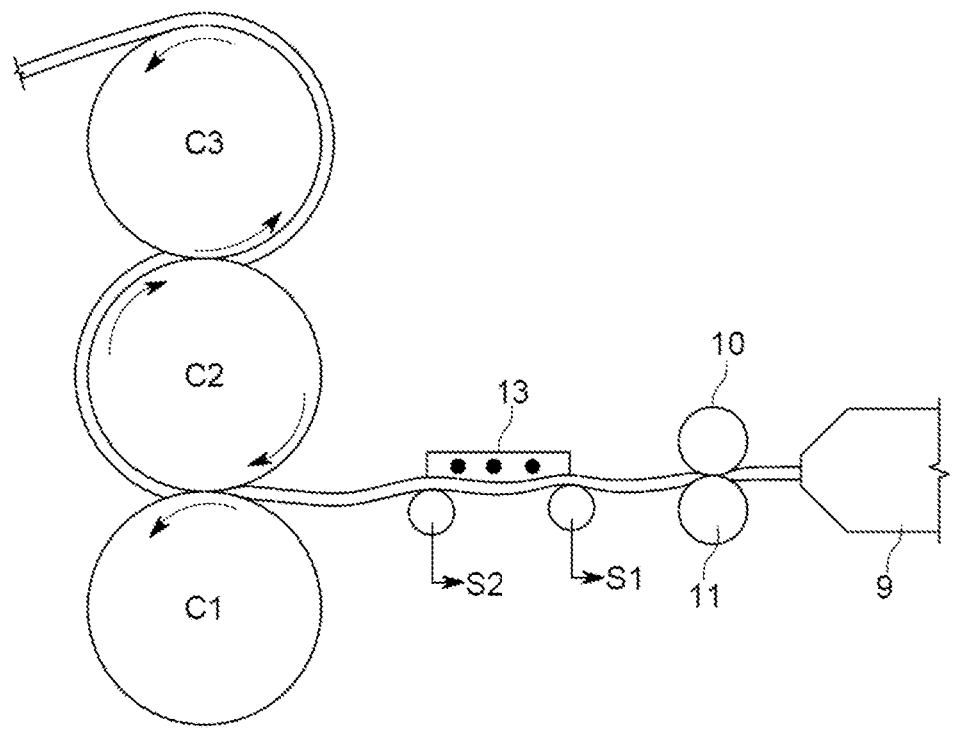
FIG. 3: explains the application of a structure in the wearing layer.

If we now examine FIGS. 2, 3 and 4 together, we can state that the speed of rolls C1, C2 and C3 is decisive (master) in this process. These therefore have the speed that is selected by the operator. The rolls before and after these rolls operate automatically as follower (slave), these therefore adapt, via synchronization and measurement and offset systems, their peripheral speed so as to be able to guarantee a complete production process with a constant tension. Of course, the discharge rate of the melt from the die (9) must also be constant for this process to be kept stable overall.

Figure 5:
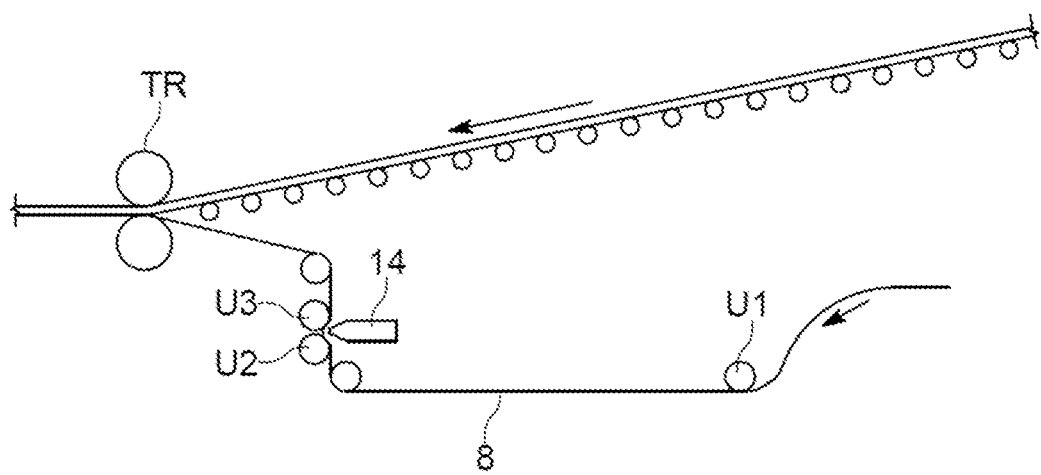
FIG. 5: shows schematically the application of a bottom layer against the underside of the sheet material.

Step 5, Gluing of the Bottom Layer (See FIG. 5)

The bottom layer (8) is preferably a pre-extruded PS foam layer, which is glued onto the underside of the sheet (1). The purpose of this bottom layer is generally known in applications of floating floor covering.

The bottom layer comes from a roll, via constant web guidance and constant web tensioning measured by roll U1, the layer (8) will be glued to the bottom of our sheet. The layer of adhesive (7) is applied by means of a special gluing head (slip nozzle). The bottom layer (8) slips with a specified force over the slip nozzle, which will apply an amount of glue on the bottom layer; the glue is heated in a reservoir and forced by gear pumps into the slip nozzle over a roll system U2 and U3 ensuring a constant area of contact between the outlet of the slip nozzle (14) and the bottom layer (8), so that a constant amount of glue will be applied on the bottom layer. The bottom layer then goes under the pinch rolls TR and is thus pressed against the sheet, which is produced as described above.

The speed of the gear pumps is controlled by the speed of the pinch rolls TR, thus guaranteeing a constant yield/m$^2$ glue. Factors such as residual temperature and open times of the glue must be taken into account.

Constant web guidance ensures that the bottom layer is or will always be glued on the sheet at one and the same tension.

Practically all steps of the production process have now been completed. After gluing, the sheet is trimmed to width, the left and right edge strips are removed by means of circular saws, cutting or cutting-off devices so that we finally obtain a constant width of the sheet. After removing the edge strips, the sheet will be reduced to the desired length, preferably by means of a sawing, cutting or cutting-off device.

Once the sheet has been reduced to the desired length, it goes through a brush system to remove all residues from the sawing operation, and in a last step the sheets are provided with a UV varnish coat (6). This varnish coat on the one hand provides a matt finish, and on the other hand this varnish coat is an extra protection against soiling of the floor.

The varnish coat is applied using classical rotary applicators, two layers are applied wet in wet, and after applying the varnish these are cured by means of UV lamps.

The invention claimed is:

1. A method for forming a multilayer plastic sheet material for floor and/or wall panels, comprising:
    melting, under pressure, a first polymer mass comprising a rigid PVC and a second polymer mass comprising a flexible PVC and passing the first and second polymer masses through an extruder head at a specified discharge rate in the form of a multilayer plastic strand in sheet form, the top layer of which is formed by the second polymer mass,
    passing the multilayer plastic strand to two or more rolls of a calendering device and processing the multilayer plastic strand into a sheet of defined thickness,
    leading away the sheet of defined thickness via a transport device to a sawing device to be cut to the desired length,
    after the plastic strand in sheet form leaves the extruder head, passing the plastic strand in sheet form between a top roll and a bottom roll of a pre calendering unit,
    wherein the speed of the rolls of the calendering device and the rolls of the pre calendering unit is synchronized with the discharge rate of the plastic strand in sheet form from the extruder head,
    further comprising providing the plastic material with a decorative effect by a) applying a decorative layer of PVC on the multilayer plastic strand before the multilayer plastic strand in sheet form is passed between the top roll and the bottom roll of the pre calendaring unit, or b) by applying a transparent wear layer with a thickness of between 0.1 and 1 mm, which is provided with a print, on the multilayer plastic strand before the multilayer plastic strand in sheet form is passed between the top roll and the bottom roll of the pre calendaring unit.

2. The method according to claim 1, characterized in that a wear layer with a thickness of between 0.1 and 1 mm is applied on the decorative layer before the plastic strand in sheet form is passed between the top roll and the bottom roll.

3. The method according to claim 1, further comprising heating the wear layer before it is applied.

4. The method according to claim 1, further comprising deflecting the plastic strand in sheet form between the extruder head and the pre calendering unit.

5. The method according to claim 2, further comprising, after the pre calendering unit, passing the plastic strand in sheet form over two support rolls in the direction of the calendering device, partially heating the wear layer of the plastic strand in sheet form again between the support rolls, and then applying a structure in the wear layer by means of a roll of the calendering device.

6. The method according to claim 1, characterized in that the sheet material has an elastic modulus above 1000 N/mm$^2$.

7. The method according to claim 1, wherein the defined thickness is between 3 and 10 millimeters.

8. A method for forming a multilayer plastic sheet material for floor and/or wall panels, comprising:
    melting, under pressure, a first polymer mass comprising a rigid PVC and a second polymer mass comprising a flexible PVC,
    passing the first polymer mass through a first extruder and passing the second polymer mass through a second extruder, both the first and the second extruders connected to a multilayer T-die, wherein the passing of both the first and the second polymer masses is at a specified discharge rate in the form of a multilayer plastic strand in sheet form, the top layer of which is formed by the second polymer mass,
    passing the multilayer plastic strand to two or more rolls of a calendering device and processing the multilayer plastic strand into a sheet of defined thickness,
    leading away the sheet of defined thickness via a transport device to a sawing device to be cut to the desired length,
    after the plastic strand in sheet form leaves the extruder head, passing the plastic strand in sheet form between a top roll and a bottom roll of a pre calendering unit,
    wherein the speed of the rolls of the calendering device and the rolls of the pre calendering unit is synchronized with the discharge rate of the plastic strand in sheet form from the extruder head,
    further comprising providing the plastic material with a decorative effect by a) applying a decorative layer of PVC on the multilayer plastic strand before the multilayer plastic strand in sheet form is passed between the top roll and the bottom roll of the pre calendering unit, or b) by applying a transparent wear layer with a thickness of between 0.1 and 1 mm, which is provided with a print, on the multilayer plastic strand before the multilayer plastic strand in sheet form is passed between the top roll and the bottom roll of the pre calendaring unit.

\* \* \* \* \*